United States Patent Office 3,288,579
Patented Nov. 29, 1966

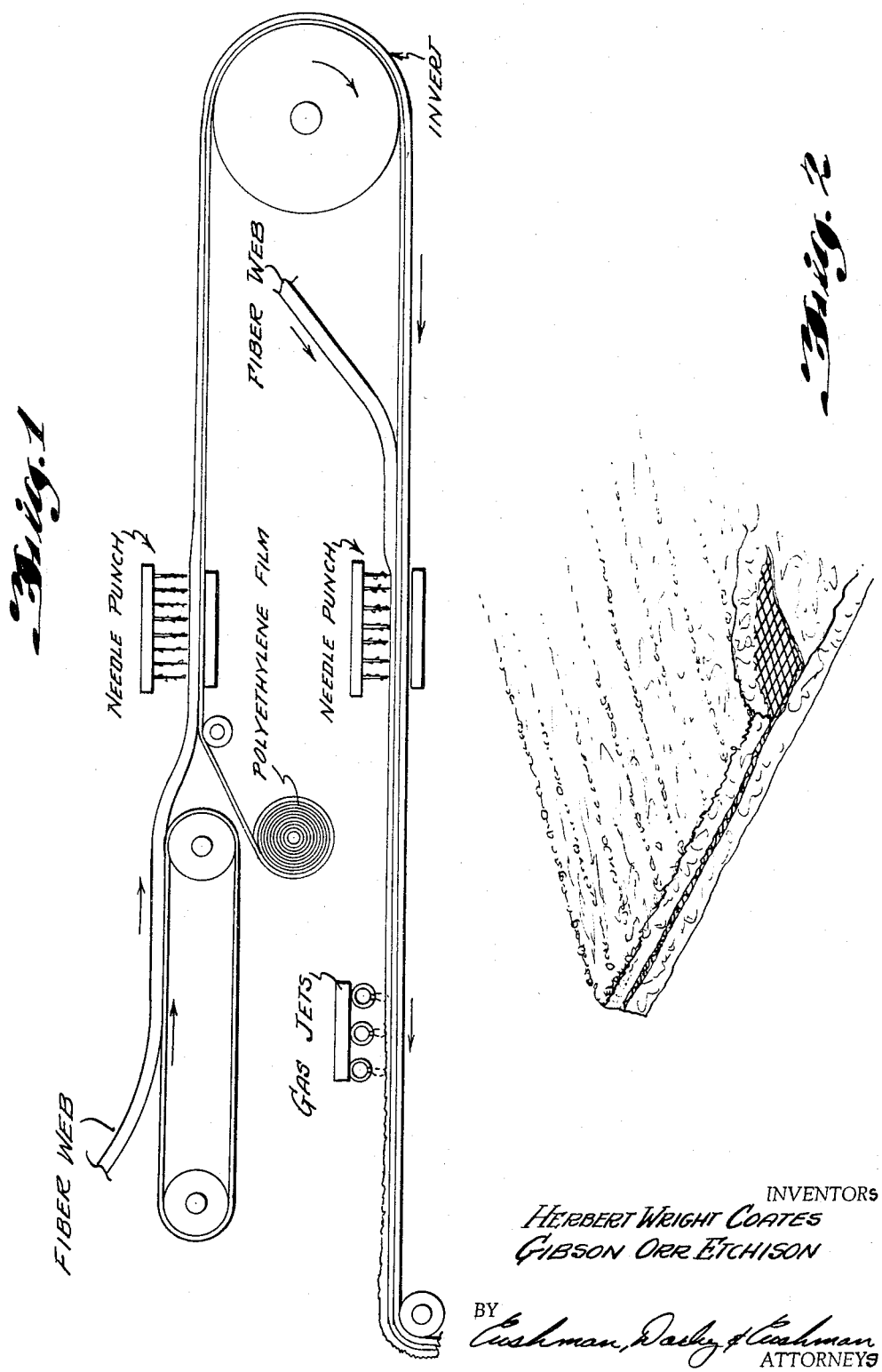

3,288,579
METHOD OF MAKING A NON-WOVEN LAMINATED ABRASIVE ARTICLE
Herbert Wright Coates, Fairfax, and Gibson Orr Etchison, River View, Ala., assignors to West Point-Pepperell, Inc., a corporation of Georgia
Filed Sept. 10, 1963, Ser. No. 308,001
6 Claims. (Cl. 51—295)

The present invention relates to a nonwoven fabric having a rough or abrasive surface and a method of making it, and more particularly, to a fabric carrying, on its surface, beads or nodules of thermoplastic material which are integral with fibers in the fabric and to a method of making it from a nonwoven fiber web.

The principal object of the present invention is to convert a readily-available nonwoven fiber web into a fabric having a rough or abrasive surface of hard granules of thermoplastic material which are integrally connected to fibers in the fabric. This is achieved, generally, by needle punching the fabric to produce fiber tufts extending normal to the surface of the fabric, and then heating a surface of the fabric sufficiently to melt part of the fibers without melting the body of the web. Some of the fibers in the tufts melt and other fibers melt and curl and collapse against the upstanding tufts to form beads or nodules. Upon curling, the cloth has a rough surface of plastic nodules lying against a fabric base.

In one embodiment, the fabric is a nonwoven web which is laminated with a smooth plastic film, and fibers are needle punched through the film. Heat is applied to the fibers needled through the film, and the film acts as a barrier to protect fibers behind it. Fibers between the film and the source of heat are melted quickly, but the film, because of its greater mass and density, does not. It is also possible to use a woven or knitted fabric or a scrim in addition to or as a substitute for the film.

In a preferred form, a fiber web is needled into each side of the film or base layer. The heating step may be sufficiently severe to cause melting of a large portion of the web on the side of the film which is heated, thereby producing relatively heavy nodules, while the reverse side of the laminate is a soft fiber web. The latter may, if desired, be laminated with another cleaning utensil such as natural or synthetic sponge.

In another embodiment, the fabric is dusted with a finely powdered non-fusible abrasive or other particulate material such as sand, Carborundum or the like. As the fibers melt or curl, they draw a quantity of abrasive grit into the nodules where they remain embedded on cooling. The abrasive or other particulate material may be colored in which case the nodules provide a colored dot pattern against the background of the fabric.

Any thermoplastic material may be used in accordance with the invention so long as it is capable of being formed into fibers. For particular purposes, fibers will be selected in accordance with the hardness of the thermoplastic material of which they are composed, the strength of the fibers and their melting point. However, the following are particularly useful: polypropylene, polyethylene and other polyolefins, nylon such as polyhexamethylene adipamide and polycaproamide, polymers and copolymers of vinylidene chloride such as the copolymers with acrylonitrile or vinyl chloride, copolymers of vinyl chloride with vinyl acetate such as those known as vinal, polyesters such as polyethylene terephthalate, and polymers and copolymers of acrylonitrile known as acrylics and modacrylics. Minor amounts of non-thermoplastic or natural fibers may be present in the web such as cotton or wool.

The nonwoven fiber webs are composed of fibers on the order of 1.5 to 6.0 denier. Heavier fibers may be used in the case of thicker or more dense webs, but it is important that the size of the fibers be limited somewhat. This is desirable since the fibers adjacent the surface which is heated must be sufficiently light weight to melt quickly before heat penetrates to the body of the fabric. The length of the fibers may be, for example, 1 to 3 inches. Fibers are formed into a web by any conventional means such as cross-laying or air deposition.

The needle punching step may be performed by conventional equipment such as a needle loom and the density of needling may be varied. Typically there are 50 to 1000 punches per square inch, although a higher needle density may be used, particularly by needling both sides of the web or by more than one pass through the needle loom. The nodules of plastic which form during the heating step tend to form a pattern corresponding to the needle pattern. Consequently, the needle pattern may be selected to give an ornamental arrangement to the nodules.

As a film or other base layer, there may be used polyethylene or other synthetic plastic film of sufficient thickness to withstand the applied heat without substantial melting. Examples of other film materials are polypropylene, acrylics, mylar (polyethylene terephthalate), vinylidene chloride copolymers and vinyl chloride copolymers. In general, the thickness is about 3 to 30 mils, although this may be varied to meet specific needs. In some cases, it may be desirable to use two or more layers of relatively lighter film.

A fabric or scrim such as light cotton or nylon may be substituted for or used with the film. If the fabric is used alone, it should have, preferably, a relatively close weave or knit so that it will act more efficiently as a heat shield. However, if it is used together with a film, this is less critical, since the film may be placed between it and the tufts of fibers which are heated.

The source of heat which is used should be capable of heating the surface fibers without overheating the body of the fiber web. A gas flame is particularly useful. There are many types of burners available capable of sweeping across a fabric or otherwise providing uniform coverage, but these form no part of the present invention. Preferably, each flame is narrow and is adjusted to make only point contact with the fabric. This tends to localize heating and melting near the surface while the heat does not penetrate sufficiently to raise the temperature of the body of the fabric to the fusion point or to cause shrinkage. By contrast, infrared heat or a platen press tends to shrink the fabric excessively unless very carefully controlled. It is possible, however, to employ a heated roll which makes only momentary contact with the fabric as it passes. Preferably, the fabric is passed between a hot roll and one which is cooler. The cooler roll tends to protect the body of the fabric from melting. In this embodiment, the hot roll must be designed and operated so as not to stick to the melting fibers.

The invention may be more fully understood by reference to the following examples and to the drawing in which:

FIG. 1 is a schematic flow diagram showing steps in a typical process; and

FIG. 2 is a perspective view, partially in section, of a typical abrasive article.

Example 1

A nonwoven fiber web was made from polypropylene fibers (100%) to have a weight of 3.5 oz. per square yard on a laboratory card and needle punched to two layers of 8.0 mil utility grade polyethylene film using a needle density of 322 and a needle penetration of ⅝ inch. The needling caused a short length of fibers to be "trapped" between the films to space them apart. The needle structure was inverted and another 3.5 oz. per square yard web of 100% polypropylene fibers was applied on and needled to the back side at a needle density of 322 and a needle penetration of 5/8 inch.

The completed laminate was again needled on each side at a needle density of 322 and a penetration of 5/8 inch for a total of 644 needle density. A flame from a Bunsen burner was worked across one surface of the needled structure at a height just sufficient to fuse the surface fibers (i.e., those fibers protruding through or punched through the film) and to cause the plastic to collapse into nodules which hardened on cooling. These plastic nodules were anchored to the film substrate. They assumed a pattern arrangement similar to the needle pattern (a twill effect). It also was found that by varying the needle pattern, the pattern and density of the plastic nodules might be varied.

*Example 2*

Carborundum abrasive grit (silicon carbide grit No. 180) was sprinkled on one surface of sample of the needled fabric described in Example 1. The fabric was then subjected to the same flame treatment on the surface to which the abrasive had been applied. The grit became embedded in the plastic nodules where it remained entrapped on cooling.

*Example 3*

Samples of the abrasive cloth produced in Example 1 were laminated to cellulose material and distributed to participants in a test program. After having used the pads for approximately six weeks, they reported that the pads were found useful for cleaning:

(1) windows
(2) windshields
(3) white wall tires
(4) barbecue grills
(5) walls and floors
(6) oven racks, etc.

Similar pads were tested by a gasoline service station operator for use in cleaning windshields and washing cars. It was found that the abrasive pads gave excellent results and were of long durability. The operator used the pads daily for six weeks and, at the end of the test period, they were still in service condition.

*Example 4*

A fabric similar to that produced in Example 1 was slit into 1½ inch strips and pieces were adhesively bonded to rolls. The rolls were used for light sanding and loom take-up with considerable success and showed long durability.

*Example 5*

A sample of the fabric produced in Example 1 was coated with a 25% solution of natural rubber to a pick-up of approximately 60%. This sample exceeded 2,000 cycles on a Taber abrasion test before breakdown. By contrast, commercial loom take-up roll material such as cork and etched rubber was inferior to this sample when tested under the same conditions.

The rough-surface articles produced in accordance with this invention are useful in any instance in which a relatively mild abrasion is desired, and, when abrasive grit is employed, for more severe applications. Because the plastic nodules are integral with fibers forming a part of the web, they remain locked in place for a substantial period of time, and thereby can increase the durability and lifetime of the cloth. The cloth may be laminated with other cleaning articles to provide composite utensils of many types and they will find a wide variety of uses.

The invention has been described by reference to preferred embodiments. However, it will be appreciated that certain changes may be made in structure and mode of operation without departing from the spirit of the invention, as this is defined in the claims.

What is claimed is:

1. A method of manufacturing an article having a rough surface of nodules of thermoplastic material which comprises laminating to one surface of a sheet of a continuous thermoplastic film about 3 to 30 mils thick a nonwoven fiber web of thermoplastic fibers, needle punching the web to form tufts of fibers generally normal to the surface of the web and protruding through said film, heating said protruding tufts of fibers to a temperature sufficient to fuse them, so that they melt, curl and collapse to form nodules of thermoplastic against said thermoplastic film, without melting the portion of said nonwoven fiber web not protruding through said film, said film functioning as a heat barrier, to prevent melting of fibers on its opposite side because of the bulk and mass of the film, and cooling the web to reharden the thermoplastic material and provide a rough surface.

2. A method of manufacturing an article having a rough surface of hard granules of thermoplastic material comprising laminating to opposite surfaces of a sheet of continuous thermoplastic film about 3 to 30 mils thick two nonwoven fiber webs of thermoplastic fibers, needle punching from at least one side of the resulting laminate and through said film to cause fibers of at least one of said webs to protrude through said film, and into the web on the other side of said sheet, heating one side of said laminate where said fibers protrude to a temperature sufficient to melt a large portion of the web on the side of said film which is heated so that the fibers on the heated side melt, curl and collapse to form heavy nodules of thermoplastic against said thermoplastic film, without substantially melting the nonwoven fiber web on the opposite side of said sheet, said film functioning as a heat barrier, to prevent melting of fibers on its opposite side, because of the bulk and mass of the film, and cooling the web to reharden the thermoplastic material and provide a rough surface, the opposite side of said product being soft substantially unmelted nonwoven fiber web suited for adhesion to other articles.

3. A method of manufacturing an article as set forth in claim 2 in which the thermoplastic film is polyethylene.

4. A method of manufacturing as set forth in claim 2 including the step of applying rubber to said rough surface.

5. A method of manufacturing as set forth in claim 2 in which the laminate is heated by flame.

6. A method of manufacturing as set forth in claim 2 in which said thermoplastic fibers comprise polypropylene.

References Cited by the Examiner

UNITED STATES PATENTS

| | | | |
|---|---|---|---|
| 2,970,365 | 2/1961 | Morgenstern | 28—72.2 |
| 2,996,368 | 8/1961 | Hermance | 51—293 |
| 3,154,462 | 10/1964 | Smith | 28—72.2 |
| 3,171,151 | 3/1965 | Sickle et al. | 28—72.2 |

MORRIS LIEBMAN, *Primary Examiner.*

D. J. ARNOLD, *Assistant Examiner.*